(12) United States Patent
Cawley

(10) Patent No.: US 6,257,825 B1
(45) Date of Patent: Jul. 10, 2001

(54) ROBOTIC PALLETIZING SYSTEM

(75) Inventor: Don Cawley, Port Naches, TX (US)

(73) Assignee: Sage Automation, Inc., Beaumont, TX (US)

( * ) Notice: Subject to any disclaimer, the term of this patent is extended or adjusted under 35 U.S.C. 154(b) by 0 days.

(21) Appl. No.: 09/574,148

(22) Filed: May 18, 2000

Related U.S. Application Data

(62) Division of application No. 09/338,200, filed on Jun. 22, 1999.

(51) Int. Cl.$^7$ .................................................. B65G 57/03

(52) U.S. Cl. ................................. 414/793.4; 414/794.3; 414/799; 198/415; 198/594; 198/431

(58) Field of Search ..................................... 198/415, 588, 198/594, 431, 436; 414/799, 793.4, 794.4, 794.5, 794.6

(56) References Cited

U.S. PATENT DOCUMENTS

| | | | |
|---|---|---|---|
| 3,241,692 | * | 3/1966 | Johnson ............................. 414/794.4 |
| 3,294,257 | * | 12/1966 | Davies et al. ..................... 414/794.3 |
| 4,002,249 | * | 1/1977 | Shinomiya et al. ............... 414/794.4 |
| 4,976,584 | * | 12/1990 | Focke ................................ 414/792.9 |
| 5,338,150 | * | 8/1994 | Focke et al. ......................... 414/799 |
| 5,685,416 | * | 11/1997 | Bonnet ................................. 198/812 |

FOREIGN PATENT DOCUMENTS

128791 * 7/1960 (SU) ..................................... 414/799

* cited by examiner

*Primary Examiner*—Joseph A. Fischetti
(74) *Attorney, Agent, or Firm*—Fulbright & Jaworski LLP

(57) ABSTRACT

A robotic palletizing apparatus includes a conveyor and retractable product support having a support surface controllably extending beyond one end of the conveyor to support the bottom of an article beyond the conveyor end and retracting from the extended position such that the article supported thereon falls substantially flat from its otherwise supported condition.

10 Claims, 6 Drawing Sheets

ROBOTIC PALLETIZING SYSTEM

This application is a divisional application of U.S. Ser. No. 09/338,200, filed Jun. 22, 1999.

FIELD OF THE INVENTION

The invention is in the field of product palletizing.

BACKGROUND OF THE INVENTION

Immediately after manufacture or before shipping of products, the products are often transferred in boxes, bags, cartons, or the like on conveyor belts. Such packaged, conveyed products must be removed from the conveyor for further packaging and shipping. Frequently, such products must be palletized.

Robots and human labor have been long used to remove products from conveyors to place them on pallets on other shipping platforms. The movement of robots and labors is often slower than the speed of which the conveyor is capable and adds complexity and expense to the packaging process. As a result, the conveyor must be slowed or more resources must be added for palletizing.

It has long been desired to develop a mechanism to deliver products directly from a conveyor to pallets or other bulk shipping containers.

SUMMARY OF THE INVENTION

There is provided in this disclosure a robotic palletize apparatus comprising an articulating convey having first and second ends; a pivot located at the first end of the articulating conveyor; a product support located at the second end of the articulating convey; a robot in articulating communication with the articulating conveyor; and a delivery sensor in communication with the product support. The articulating conveyor may further comprise a product orientor. The product orientor may comprise an orienting conveyor. The orienting conveyor may be arched. The product support may comprise a tongue extender. The second end of the articulating conveyor may be angled relative to a gravitational plane. The tongue extender may comprise a tongue and pneumatic cylinder. The apparatus may comprise a product sensor. A feed conveyor may be in proximal communication with the first end of the articulating conveyor. The apparatus may comprise a stop.

There is provided also in this disclosure a method of stacking product directly from a conveyor, comprising the steps of conveying a product toward the end of a conveyor; supporting a leading edge of the product as the leading edge exits the conveyor; releasing the leading edge and a following edge of the product with such timing as to cause the product to fall substantially flat onto a platform; and articulating the conveyor, whereby product is stacked in a pattern. The platform may be a pallet and a robot may articulate the conveyor. The supporting step may comprise extending a tongue and the releasing step may comprise retracting the tongue. The method may comprise the step of sensing the location of the product relative to the location of an end of the conveyor. The method may comprise the step of sensing the location of the product relative to the location of the tongue. The method may comprise the step of orienting the product.

DETAILED DESCRIPTION OF THE PREFERRED EMBODIMENT

Figure 1:
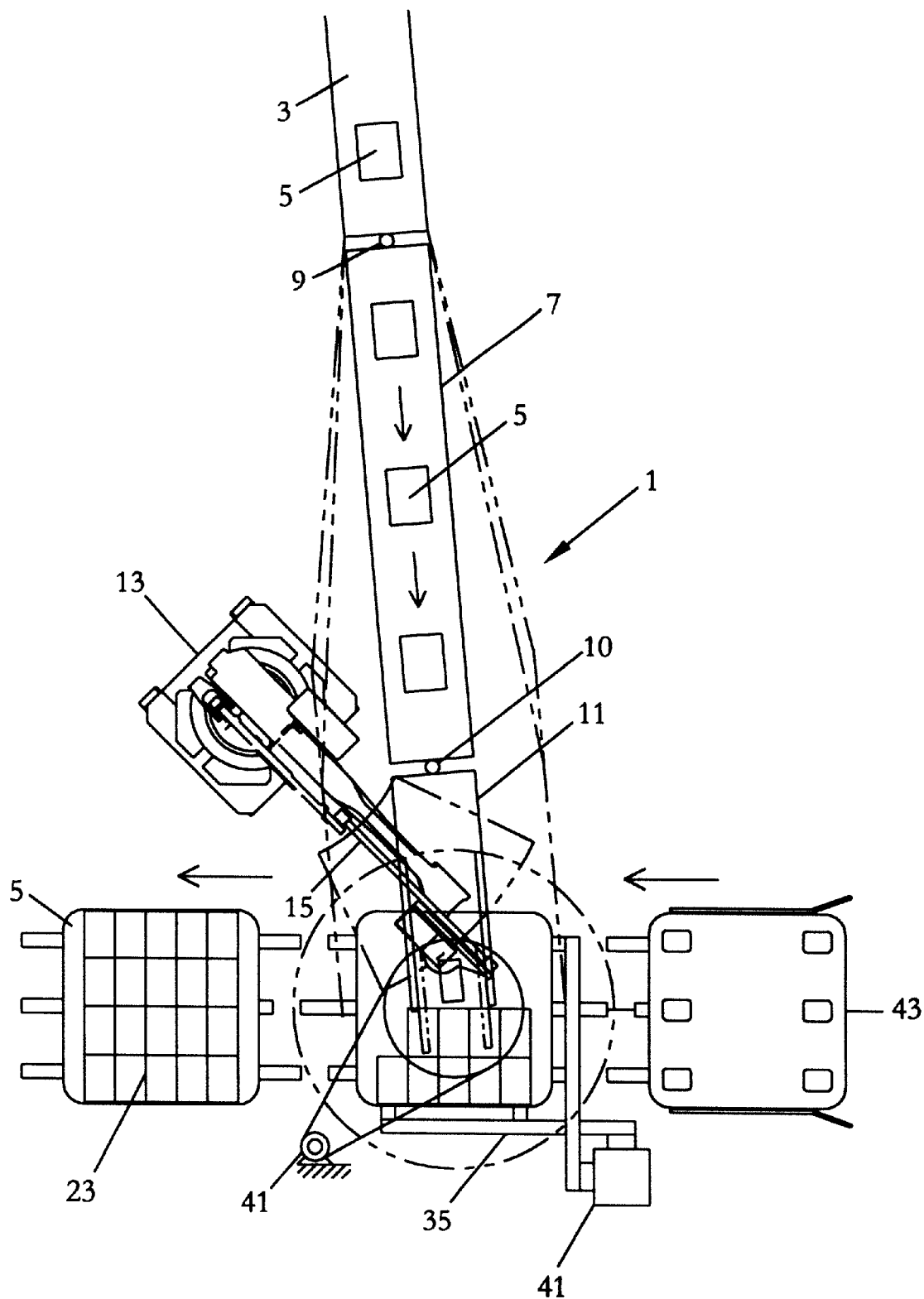
FIG. 1 is a top view of a robotic palletizing apparatus illustrative of the present invention.
Figure 2:
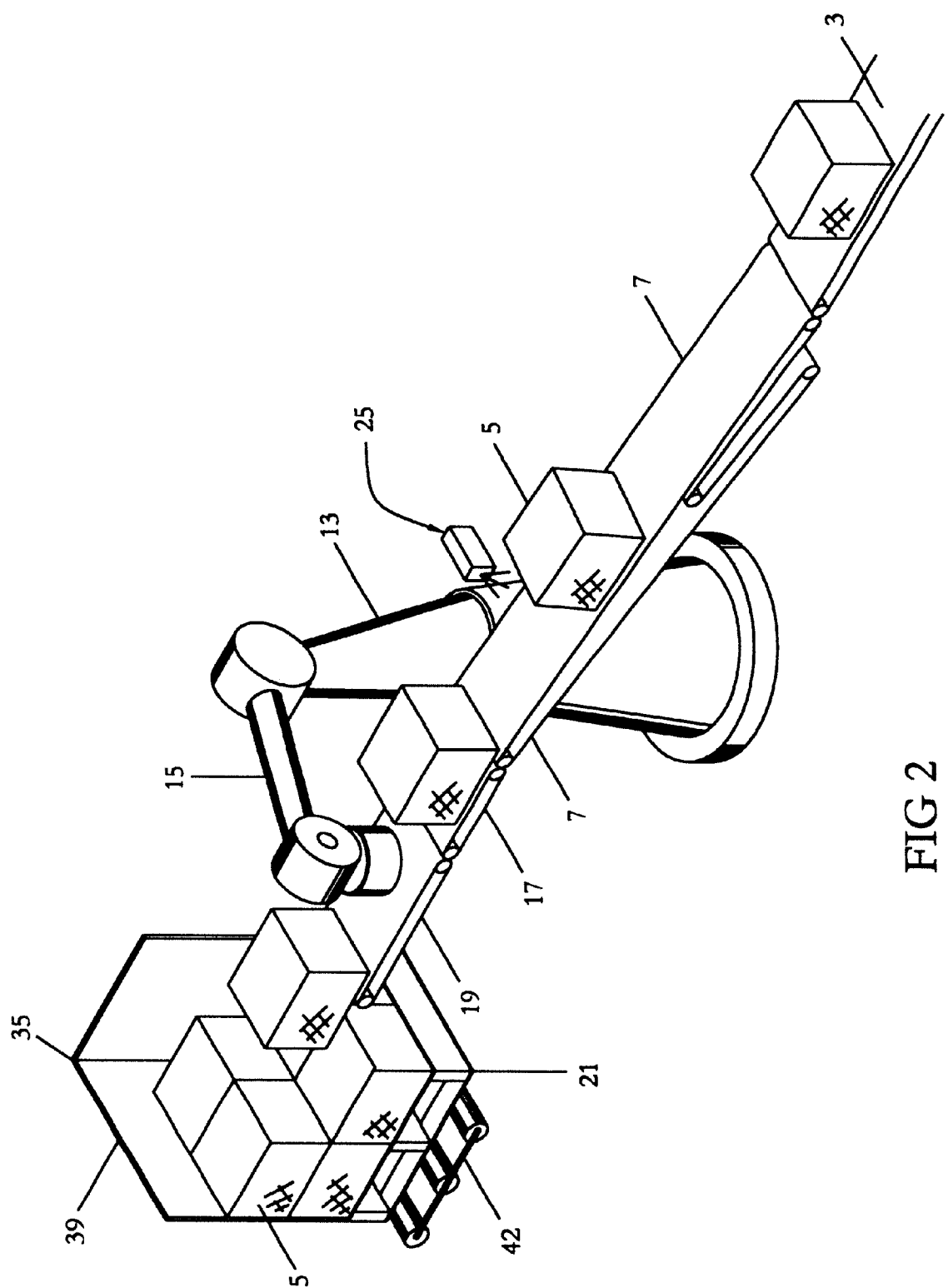
FIG. 2 is a side view of the robotic palletizing apparatus of FIG. 1
Figure 3:
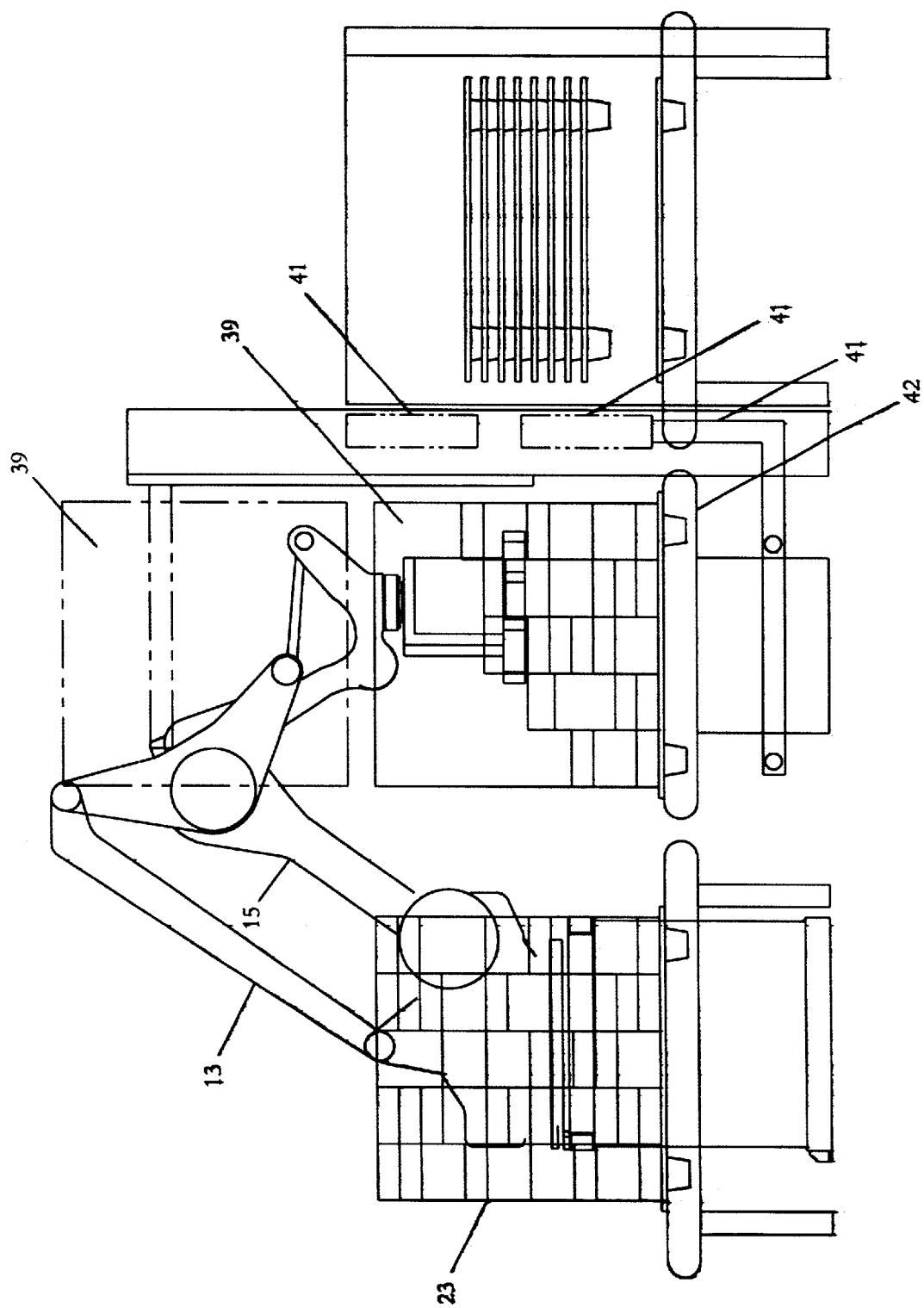
FIG. 3 is an end view of the robotic palletizing apparatus of FIG. 1
Figure 4:
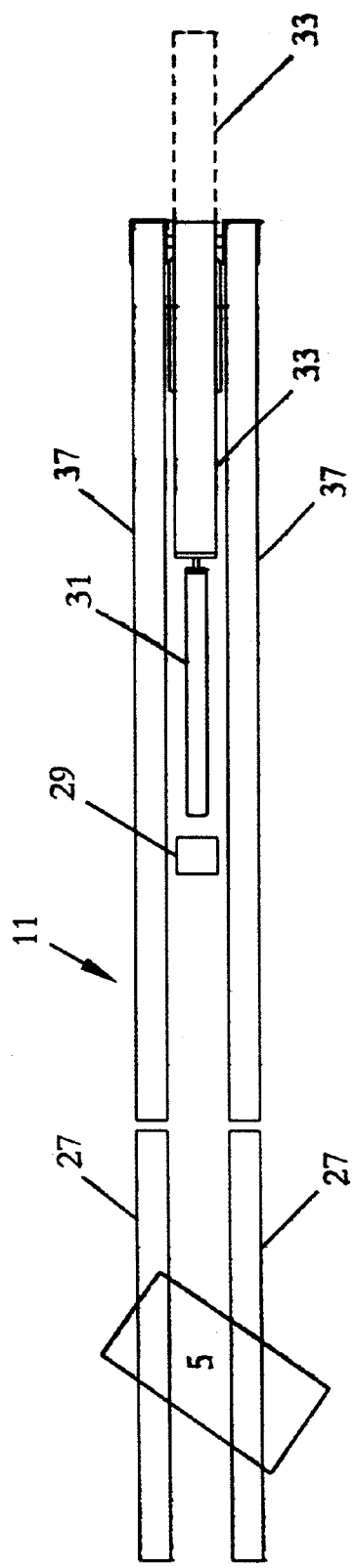
FIG. 4 is a top view of an end effector

FIGS. 1–7 and 9 are of a palletizing apparatus 1 illustrative of the present invention. Feed conveyor 3 is fixed. It conveys a box 5 toward an articulating conveyor 7. The articulating conveyor 7 pivots at point 9. The articulating conveyor 7 includes an end effector 11. The end effector 11 comprises orienting conveyor 17 and palletizing conveyor 19. To the end effector 11 is connected a robot 13. The robot 13 is of any suitable type known to those of ordinary skill in the art, and manipulates with articulating arm 15 the end effector 11 and articulating conveyor about point 9. The robot 13, manually or using computer logic, moves articulating arm 15 as required to deliver boxes 5 onto a pallet 21 in a pattern such as 23. The computer logic may be preprogrammed for a particular product size. Product sensor 25 may communicate with the computer logic. Product sensor 25 may be a weight sensor, size sensor, orientation sensor, or any combination thereof. It may sense by any means known to those or ordinary skill in the art, including optical, sonic, tactile means.

Figure 5:
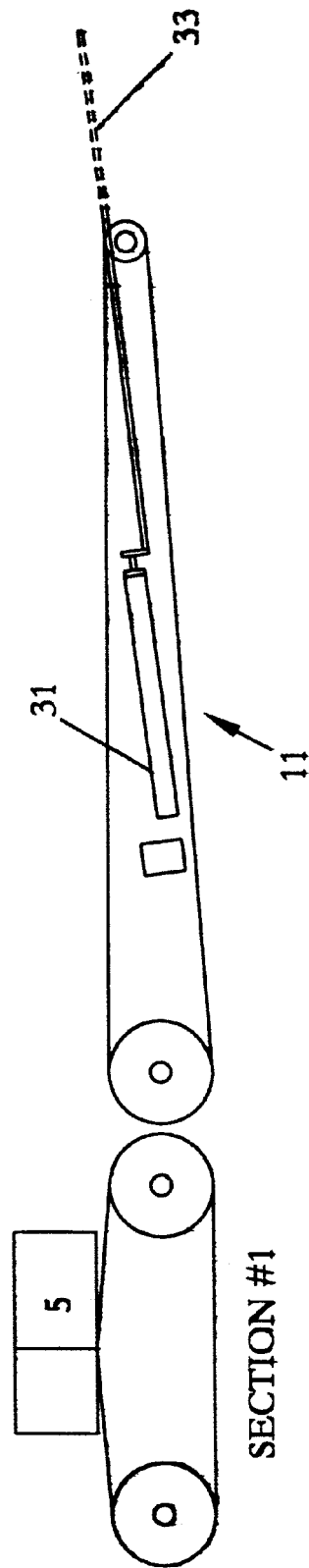
FIG. 5 is a side view of an end effector
Figure 6:
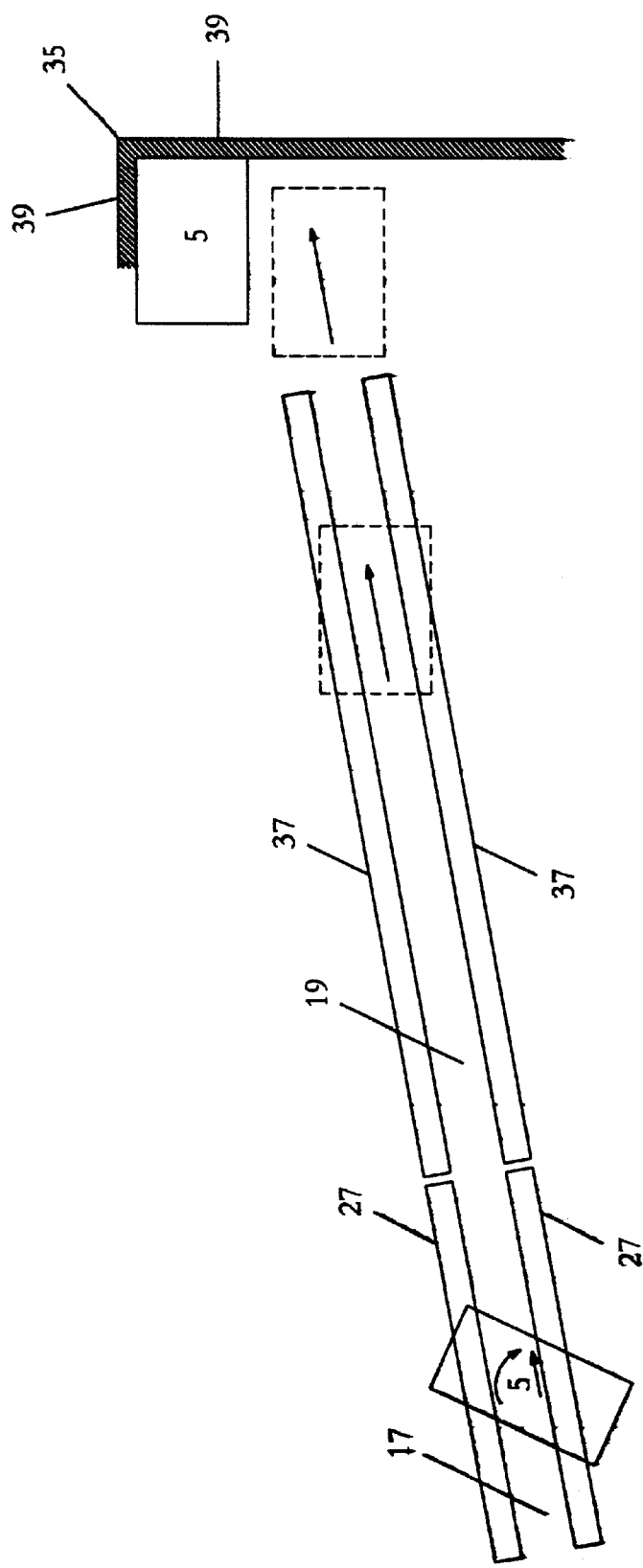
FIG. 6 is a top view of an end effector
Figure 7:
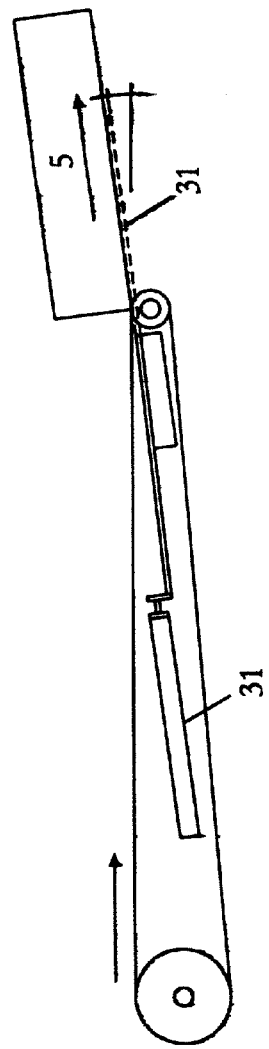
FIG. 7 is a side view of a palletizing conveyor

As box 5 exits articulating conveyor 7 and enters the orienting conveyor 17, orienting belts 27 travel at different speeds, rotating box 5 so as to give it an orientation suitable for delivery onto pallet 21. The orienting belts 27 may be driven in logic communication with product sensor 25. The orienting conveyor 17 may be arched as illustrated in FIG. 5. Such arching may control traction between the box 5 and the orienting belts 27, and effect more predictable orientation of box 5. Any suitable apparatus, in addition to the orienting conveyor, may be used to orient box 5.

After box 5 exits the orienting conveyor 17 and enters the palletizing conveyor 19, a delivery sensor 29 may detect the approach of box 5 to the exit end of palletizing conveyor 19. The delivery sensor 29 is in logic communication with a product stabilizer, such as tongue extender 31. As box 5 exits the palletizing conveyor 19, tongue extender 31 extends tongue 33 so as to prevent the leading edge of box 5 from falling as it exists the palletizing conveyor 11. Once a predetermined portion of box 5 is on tongue 33, tongue 33 rapidly retracts. The rapid retraction causes the leading and following edges of box 5 to begin falling at substantially the same time. Thus, tumbling of the box 5 is reduced. The tongue extender 31 may comprise an entender mechanism of those types known to those of ordinary skill in the art, including, but not limited to, pneumatic cylinders and electric servo motors.

In order to facilitate box 5 falling flatly onto pallet 21, the existing end of palletizing conveyor 19 may be elevated in coordination with the speed of retraction of tongue 33. The desired degree of elevation is inversely proportional to the speed of retraction of the tongue 33. Testing has shown that a box 5 will fall flatly onto a pallet if the palleting conveyor is elevated about 5° from the gravitational plane and the tongue retracts in about 0.1 seconds.

To facilitate orderly stacking of boxes 5 onto pallet 21, a first box 5 may be delivered by the end effector 11 to corner 35. The speed of the belts 37 of palletizing conveyor 19 may be sufficient to throw the box 5 into corner 35. If such speed is not sufficient to do so, the end effector 11 or the pallet 21 may be manipulated relative to each other to effect desired placement of box 5. Stop 39 may be positioned to stabilize box 5 as it exits the palletizing conveyor 19 and enters the corner 35. Once box 5 has been delivered to corner 35, robot 13 may move end effector 11 so as to deliver subsequent boxes to a corner comprising either the stop 39 or the preceding box 5. Once a pallet is full, it may be removed and replaced with an empty pallet 43. Boxes on a pallet, during or after palletizing, may be plastic wrapped for stability using wrapper. The wrapper 41 and stop 39 may be raised and lowered as reflected in FIG. 3 as boxes 5 are stacked higher, or to facilitate removal of loaded pallets from palletizing surface 42.

Figure 8:
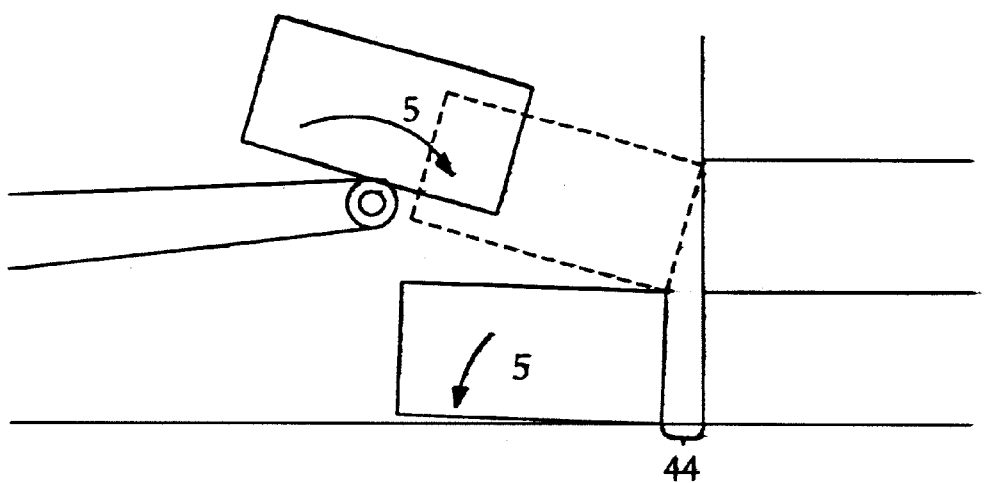
FIG. 8 is a side view of a palletizing conveyor
Figure 9:
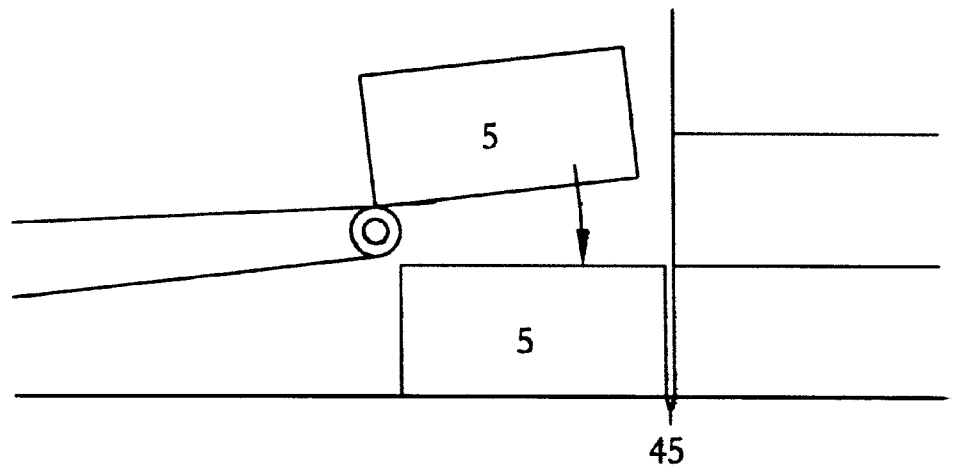
FIG. 9 is a side view of a palletizing conveyor

The advantage of the use of a tongue extender is illustrated by FIGS. 8 and 9. In FIG. 8, without a product stabilizer, the box 5 rotates as it exits a conveyor because the leading edge of box 5 begins to fall before the following edge of box 5 begins to fall. The rotation causes box 5 to create a relatively large gap 44. In FIG. 9, a stabilized box 5 falls flatly, without substantial rotation, causing box 5 to create a relatively small gap 45, facilitating tight packing of boxes 5 onto pallet 21.

Those of ordinary skill in the art will recognize with the benefit of this disclosure, that many product stabilizers may be used in conjunction with conveyors to deliver a box flatly from the end of a conveyor. Any product stabilizer that supports the leading edge of a product as it exits the end of a conveyor, and thus enables the product to fall flatly, is suitable. Examples include but are not limited to, tongues and doors.

What is claimed is:

1. A robotic palletize apparatus comprising:

a conveyor having first and second ends said conveyor second end being a product discharge end;

an extendable and retractable product support device located at the second end of the conveyor and having a support surface controllably extending beyond said conveyor second end to support the bottom of an article outwardly of said conveyor second end, said support surface retracting from said extended position such that the article supported thereon falls substantially flat from its otherwise supported condition; and a delivery sensor in communication with the product support device.

2. The apparatus of claim 1 in which the conveyor is articulating.

3. The apparatus of claim 2 further comprising a product orientor.

4. The apparatus of claim 3 in which the product orientor comprises an orienting conveyor.

5. The apparatus of claim 1 in which the product support device comprises a tongue extender.

6. The apparatus of claim 5 in which the tongue extender comprises a tongue and pneumatic cylinder.

7. The apparatus of claim 1 in which the second end of the conveyor is angled relative to a gravitational plane.

8. The apparatus of claim 1 further comprising a product sensor along the conveyor whereby characteristics of a product may be ascertained.

9. The apparatus of claim 1 comprising a feed conveyor in proximal communication with the first end of the conveyor.

10. The apparatus of claim 1 comprising an orienting conveyor and a tongue extender.

* * * * *